July 3, 1962
C. P. MIES
3,042,266
SPRAYING DEVICE FOR LIQUID FERTILIZER
Filed Oct. 19, 1960
2 Sheets-Sheet 1
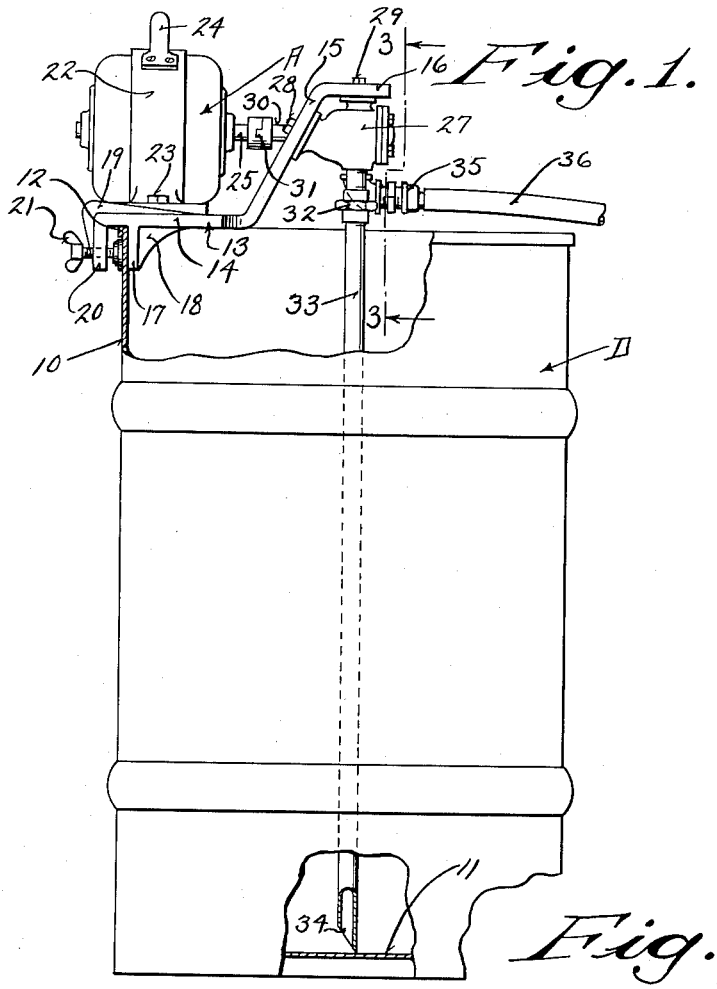
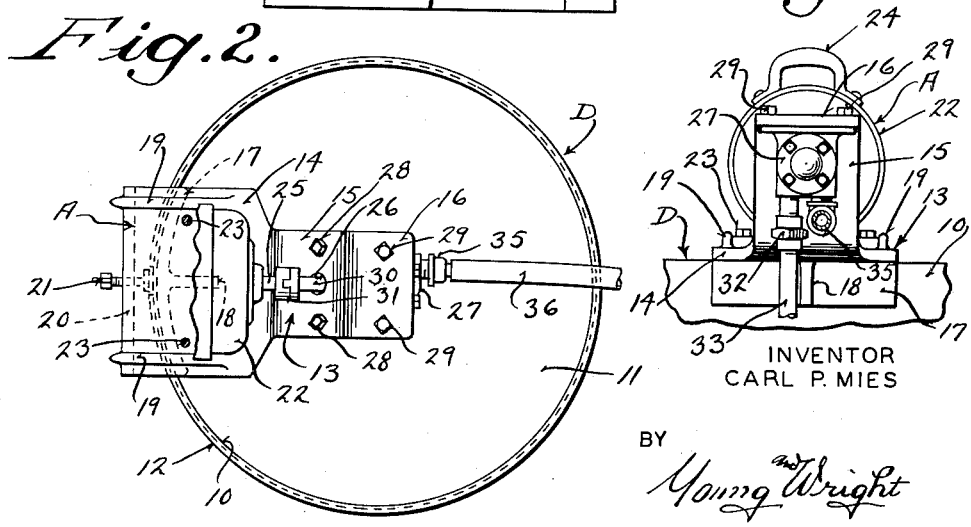
INVENTOR
CARL P. MIES
BY
*Young and Wright*
ATTORNEYS July 3, 1962            C. P. MIES            3,042,266
SPRAYING DEVICE FOR LIQUID FERTILIZER
Filed Oct. 19, 1960            2 Sheets-Sheet 2
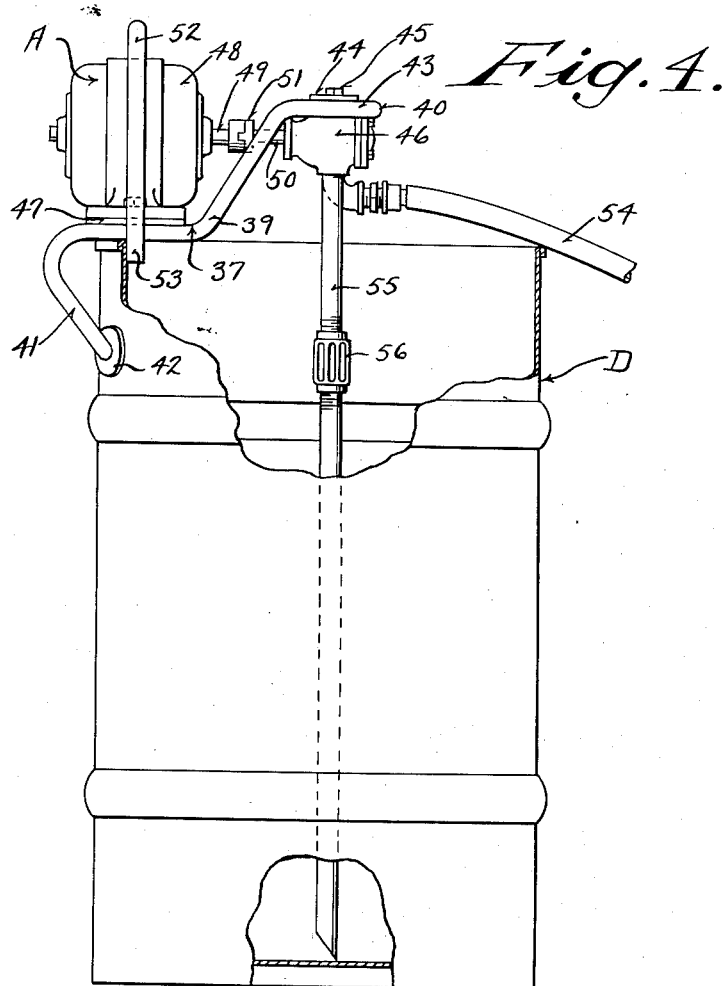
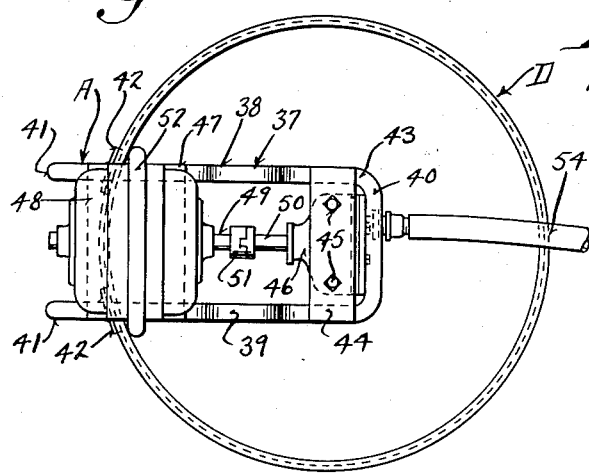
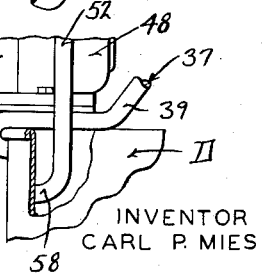
INVENTOR
CARL P. MIES
BY
Young and Wright
ATTORNEYS

United States Patent Office 3,042,266
Patented July 3, 1962

3,042,266
SPRAYING DEVICE FOR LIQUID FERTILIZER
Carl P. Mies, 3916 Thomas Ave. S., Minneapolis, Minn.
Filed Oct. 19, 1960, Ser. No. 64,240
1 Claim. (Cl. 222—180)

This invention appertains to the spraying of liquid fertilizer over lawns and the like, and more particularly to a unitary device for attachment to a drum, barrel or other large container or tank for pumping liquid therefrom, and for spraying such liquid over a large area of ground around the drum.

One of the primary objects of my invention is to provide a simple but rugged device, which can be easily and quickly attached to, or detached from, a metal drum or the like embodying a novel supporting bracket for connection with the rim of the drum, so formed as to provide an effective support for a drive motor and pump and with the motor and pump so positioned relative to one another that the pump can be driven from the motor through the use of a coupling only.

Another salient object of my invention is to provide a spraying device embodying a bracket and means thereon at its outer end for detachable engagement with the rim of a drum or the like and a suction pipe for the pump on its inner end, the pipe being of such a length as to engage the bottom of the drum and thus form an additional support for the bracket, the motor for the pump being supported on the bracket in such a manner that the major portion of its weight will be carried by the rim of the drum.

A further important object of my invention is to provide a unitary spraying attachment for connection with metal drums and the like adapted to be hooked over the rim of a barrel or drum with a suction pipe extending into the drum forming an additional support for the device, the suction pipe being adjustable as to length, whereby, upon adjustment of the length of the pipe the bracket can be tilted on the rim of the drum for clamping engagement therewith.

A still further important object of my invention is to provide a unitary spraying attachment for connection with metal drums and the like, which can be easily transported from place to place and which is of an exceptionally simple and durable character, and one which can be manufactured and placed upon the market at a reasonable cost.

With these and other objects in view, the invention consists in the novel construction, arrangement and formation of parts, as will be hereinafter more specifically described and claimed, and illustrated in the accompanying drawings, in which drawings, FIGURE 1 is a side elevational view illustrating one preferred form of my spraying device, the view showing the device associated with a standard metal drum, parts of the figure being shown broken away and in section;

FIGURE 2 is a top plan view of my spraying device connected with a drum, parts of the figure being shown broken away and in section to illustrate structural detail;

FIGURE 3 is a detail vertical sectional view taken on the line 3—3 of FIGURE 1, looking in the direction of the arrows, the figure showing the spraying attachment in end elevation;

FIGURE 4 is a view similar to FIGURE 1, but showing another preferred form of my spraying device;

FIGURE 5 is a top plan view showing that form of my invention illustrated in FIGURE 4, and FIGURE 6 is a detail fragmentary side elevational view with parts thereof broken away and in section, illustrating a still further form of my device.

Referring to the drawings in detail, wherein similar reference characters designate corresponding parts throughout the several views, the letter A generally indicates my improved spraying attachment and D a metal drum with which the same can be associated.

The metal drum D forms no part of the present invention and is of a standard type now readily purchasable on the open market, and hence this drum will not be described in detail. However, it is to be noted that the same includes a substantially cylindrical side wall 10 and a bottom wall 11. The upper edge of the side wall 10 can be rolled to provide a rim 12. While I have shown my spraying attachment A connected with a drum D, it is to be understood that the same can be associated with any other desired type of container or tank.

My spraying attachment A comprises a novel bracket 13 shaped to form a wide base 14 and an upwardly and forwardly inclined arm 15. The forward end of the arm 15 terminates in a horizontally disposed leg 16, the purpose of which will later appear. It is to be noted that the arm 15 and the leg 16 are of considerably less width than the base portion 14. Formed on the lower surface of the base portion 14 is an arcuate depending flange 17 which is adapted to conform to the curvature of the side wall 10 of the drum D. This flange 17 is spaced from the outer end of the base portion 14 and hence when the flange 17 engages the inner face of the wall 10 such base portion 14 will project over the rim, as is clearly shown in FIGURES 1 and 2 of the drawings. The flange 17 can be reinforced by an integral web 18 which extends from the flange to the lower face of the base portion 14. The upper face of the base portion 14 has formed thereon spaced parallel reinforcing ribs 19. The extreme outer end of the base portion 14 in spaced relation to the flange 17, is provided with a depending wall 20 and this wall carries an adjustable winged clamping screw 21. When the device is placed over the rim of the drum D with the flange 17 in intimate engagement with the inner surface of the wall 10 thereof, upon tightening of the screw 21 the bracket 13 will be firmly secured to the drum.

Mounted upon the base portion 14 is an electric motor 22 of the desired rating and the base of the motor is bolted, as at 23, to the base portion 14. The motor is confined between the ribs 19 and hence the motor and the bracket are rigidly connected together. The upper end of the motor casing can have secured thereto a handle 24, whereby the entire appliance can be easily carried about. Extending toward the arm 15 of the bracket is the armature shaft 25 of the motor and the arm directly in front of the armature shaft is provided with an opening 26.

Carried by the arm 15 and the leg 16 of the bracket is a rotary pump 27 of any preferred type, now found on the open market and this pump is securely fastened by bolts 28 to the arm 15 and by bolts 29 to the arm 16. The pump shaft 30 of the pump extends through the opening 26 and is connected to the armature shaft through the use of a coupling 31. The inlet of the pump 27 has connected therewith by means of a pipe coupling 32 a suction pipe 33, and this pipe is adapted to extend into the drum D and the pipe is of such a length as to engage the bottom wall 11 of the drum. Hence, this pipe also forms a supporting leg for the spraying device. The lower end of the pipe 33 is cut at an angle, as at 34, so as to permit the free flow of liquid into the same. The outlet of the pump 27 has connected thereto by means of a pipe coupling 35 a flexible hose 36 of a desired length and the outer end of this hose carries a spray nozzle (not shown).

Great stress is laid on the construction and arrangement of the bracket 13 in conjunction with the supporting pipe 33 and the rim clamp, as by this construction the entire spraying device can be quickly associated with or removed from a standard type of drum.

While the device is particularly useful for spraying a liquid fertilizer over an area, it is to be also understood that the drum D can contain a liquid insecticide and that my spraying apparatus can be utilized for spraying trees and other foliage. Due to the large capacity of the drum D a large area of ground can be sprayed without the necessity of repeated refillings of a container.

In FIGURES 4 and 5, I have illustrated another form of my spraying device and in this form, I utilize tubing as a frame or bracket instead of a metal plate or casting. Thus, in this form of my invention, I provide a base frame 37 formed from tubing and the tubing is bent into a substantially U-shape, in top plan, to provide spaced parallel legs 38 and 39 and a connecting bight portion 40. The outer ends of the legs 38 and 39 are bent downwardly and inwardly to provide supporting arms 41 which are adapted to extend on the exterior of the drum and the lower ends of these legs can have welded or otherwise secured thereto broad feet 42 for engaging the outer surface of the drum. The forward ends of the legs are bent upwardly and inwardly and terminate in a substantially horizontal portion 43. Secured to the horizontal portion 43 is a plate 44 and this plate in turn has securely bolted thereto, as at 45, a desired type of rotary pump 46. A platform 47 is welded or otherwise fastened to the legs 38 and 39 and this platform has bolted thereto an electric motor 48. The armature shaft 49 of the motor projects toward the pump 46 and the pump shaft 50 is connected to the armature shaft 49 by a coupling 51.

Welded or otherwise fastened to the legs 38 and 39 is a transversely extending upright U-shaped frame piece 52 and this frame piece is also formed from tubing of the desired gauge. The frame piece extends around the motor and projects above the motor to form a carrying handle and the lower ends of the frame piece project below the legs 38 and 39 to form clamping feet 53 for engaging the interior face of the drum. It is to be noted that the feet 53 are in spaced relation to the feet 42 and terminate a considerable distance above the feet 42. The outlet of the pump 46 has connected therewith a flexible hose 54 and the inlet of the pump has connected thereto a rigid suction pipe 55, and the lower end of this pipe engages the bottom wall of the drum so as to form an additional support for the spraying device. It is to be noted that the pipe 55 is formed in two sections and that the meeting ends of the sections are oppositely threaded and receive a turnbuckle pipe coupling 56, whereby the active length of the pipe 55 can be lengthened or shortened.

In placing the spraying device on the drum the frame 37 is placed at a slight angle to the drum with the feet 42 engaging the outer surface thereof, after which the frame is swung downwardly until the legs 38 and 39 engage the rim of the drum and the feet 53 about the inner surface of the drum. At this time, the coupling 56 is turned until the lower end of the pipe 55 firmly engages the bottom wall of the drum and so that an upward pressure will be exerted on the inner ends of the frame 37 and thus insures proper engagement of the feet 42 with the drum.

In FIGURE 6, a further form of my tubular construction is illustrated, and in this form, I provide hooks 57 on the outer ends of the legs 38 and 39 for engaging over the rim of the drum. The upright frame 52 is extended a considerable distance below the main frame 37 and the hooks 57, and are bent outwardly to provide feet 58 for engaging the inner surface of the drum. In this form of my invention, the spraying device is associated with the drum in the same manner as that form of my invention shown in FIGURES 4 and 5; namely, the frame 37 is slightly tilted to permit the engagement of the hooks 57 with the rim of the drum, after which the frame is swung downwardly until the feet 58 engage the inner surface of the drum.

Changes in details may be made without departing from the spirit or the scope of this invention, but what I claim as new is:

A portable spraying attachment for detachable connection with a drum or like container comprising a tubular base frame of a substantially U-shape in plan including spacer parallel legs and a connecting bight portion, said legs including a substantially horizontal base portion, upwardly and inwardly extending arm portions and a substantially horizontally disposed top portion, a depending rotary pump secured to said top portion having an outwardly projecting pump shaft extending between the arm portions and an inlet and an outlet, the outer ends of said leg portions being curved downwardly and inwardly for intimate engagement with the outer surface of the drum, an electric motor rigidly fastened to the base portion, and an upright U-shaped frame extending about said motor and secured to the base portion and projecting below said base portion for intimate engagement with the inner surface of the drum, said upright frame projecting above said motor defining a carrying handle, a flexible hose connected with the outlet and a suction pipe connected to the inlet and rigidly secured to the pump extending into said drum and engaging the bottom wall thereof.

References Cited in the file of this patent

UNITED STATES PATENTS

| | | |
|---|---|---|
| 1,974,449 | Davis | Sept. 25, 1934 |
| 2,169,514 | Buzzard et al. | Aug. 15, 1939 |
| 2,344,005 | Sundholm | Mar. 14, 1944 |
| 2,431,534 | Benner | Nov. 25, 1947 |
| 2,625,720 | Ross | Jan. 20, 1953 |

FOREIGN PATENTS

| | | |
|---|---|---|
| 474,547 | Canada | June 19, 1951 |